US005784945A

United States Patent [19]

Krone et al.

[11] Patent Number: 5,784,945

[45] Date of Patent: Jul. 28, 1998

[54] METHOD AND APPARATUS FOR DETERMINING A VALVE TRANSFORM

[75] Inventors: John J. Krone; Qin Zhang, both of Dunlap, Ill.

[73] Assignee: Caterpillar Inc., Peoria, Ill.

[21] Appl. No.: 855,924

[22] Filed: May 14, 1997

[51] Int. Cl.[6] .............................. F15B 13/16; F16D 31/00

[52] U.S. Cl. .................................. 91/361; 91/459; 60/327

[58] Field of Search .................................. 60/327; 91/361, 91/459, 392, 364, 403, 410

[56] References Cited

U.S. PATENT DOCUMENTS

| | | | |
|---|---|---|---|
| 3,821,625 | 6/1974 | Scholl | 318/624 |
| 4,747,335 | 5/1988 | Budzich | 91/361 |
| 4,901,625 | 2/1990 | Bussan et al. | 91/361 |
| 4,991,491 | 2/1991 | Neumann | 91/361 |
| 5,012,722 | 5/1991 | McCormick | 91/361 |
| 5,218,895 | 6/1993 | Lukich et al. | 91/361 |
| 5,230,272 | 7/1993 | Schmitz | 91/361 |
| 5,261,234 | 11/1993 | Holloway et al. | 60/462 |
| 5,305,681 | 4/1994 | Devier et al. | 91/361 |
| 5,537,818 | 7/1996 | Hosseini et al. | 60/327 |
| 5,537,819 | 7/1996 | Kobayashi | 60/459 |
| 5,540,049 | 7/1996 | Lunzman | 60/327 |
| 5,628,187 | 5/1997 | Gollner | 60/327 |

*Primary Examiner*—Hoang Nguyen
*Attorney, Agent, or Firm*—David M. Masterson; W. Bryan McPherson

[57] ABSTRACT

The invention is an apparatus for determining a valve transform curve in a fluid system. The fluid system has a valve and a fluid actuator arranged to initiate movement of a load. The invention includes a desired velocity manager, a load responsive device, and a valve transform curve manager. The desired velocity manager determines a desired velocity of the load. The load responsive device determines a characteristic of the load, such as weight or position. The valve transform curve manager receives responsively determine a valve transform curve based on the desired velocity and load characteristic.

56 Claims, 16 Drawing Sheets

100

METHOD AND APPARATUS FOR DETERMINING A VALVE TRANSFORM

TECHNICAL FIELD

This invention relates generally to a apparatus and method for controlling the movement of a load of a mobile machine and, more particularly, to an apparatus and method for determining a valve transform curve for a fluid system initiating movement of a load.

BACKGROUND ART

Mobile machines such as wheel type loaders include work implements that are capable of being moved through a number of positions during a work cycle. Such implements typically include buckets, forks, and other load handling apparatus. The typical work cycle associated with a bucket includes sequentially positioning the bucket and associated lift arm in a digging position for filling the bucket with material, a carrying position, a raised position, and a dumping position for removing material from the bucket.

Control levers, such as joysticks, are mounted at the operator's station and are connected to an electrohydraulic circuit, e.g., a fluid system, for moving the bucket and/or lift arms. From the perspective of the electrohydraulic circuit, the bucket and/or lift arms constitutes a load. The operator manually moves the control levers to open and close hydraulic valves that direct pressurized fluid to hydraulic cylinders, which in turn cause the load to move. For example, to raise the load, the operator moves the control lever associated with the lift arm hydraulic circuit to a position at which a hydraulic valve causes pressurized fluid to flow to the head end of a lift cylinder; thereby, causing the lift arms and load to raise.

Current fluid systems have an load induced dead band. For example, when the fluid system is moving a light load there may be a 5% deadband in the control lever. That is, the operator may move the control lever 5% of its total range before the load moves. As the load increases, for example as the bucket captures a larger amount of material, the dead band increases. Under a high load, the dead band can be as large as 50–60% of the control lever range. The effect of the deadband shifting can also be caused by changing engine speed and component wear. Deadband shifting can cause fatigue and frustration on the part of the operator who ideally expects that a given control lever input results in a consistent and predictable load response. The operator not know how much lever movement is required before the load moves, and as the dead band increases, the total control lever range available to control the load decreases. The dead band results from an increasing fluid pressure that is required to move an increased load amount. In order to provide for the increased fluid pressure, the spool within the valve located in the fluid system must be adjusted. The amount that the spool must be shifted to begin to move the load represents the dead band.

In typical fluid systems, a valve transform curve is a used to map spool displacement as function of desired load velocity. The control lever input forms the basis for the desired load velocity. Typically, the valve transform curve on a current fluid system is calibrated during initial assembly of the mobile machine. However, once the mobile machine is operating in the field recalibrating the valve transform curve is a time consuming and expensive process. Moreover, in many cases the valve transform curve is never recalibrated due to the time and cost of the process. Therefore, in prior systems the valve transform curve does not adapt to the immediate load conditions of the work implement. So, regardless of initial calibration efforts, a load induced dead band will be present.

The present invention is directed to overcoming one or more of the problems as set forth above by dynamically adapting the valve transform curve to account for the current operating conditions associated with the work implement.

DISCLOSURE OF THE INVENTION

In one aspect of the present invention, an apparatus for determining a valve transform curve in a fluid system is provided. The fluid system includes a valve and a fluid actuator arranged to initiate movement of a load. The apparatus includes a desired velocity manager, a load responsive device, and a valve transform curve manager. The desired velocity manger determines a desired velocity of the load and responsively generates a desired load velocity signal. The load responsive device determines a characteristic of the load and responsively generates a load signal. The valve transform curve manager determines the valve transform curve.

In another aspect of the present invention, a method for determining a valve transform curve in a fluid system is provided. The fluid system includes a valve and a fluid actuator adapted to initiate movement of a load. The method includes the steps of: determining a desired velocity of said load, determining a characteristic of said load, and determining the valve transform curve.

In yet another aspect of the present invention, an apparatus for determining a valve transform curve in a fluid system is provided. The fluid system includes a valve and a fluid actuator arranged to initiate movement of a load. The fluid system includes a desired velocity manager, a error classifier, a load classifier and a valve transform curve manager. The desired velocity manager determines a desired velocity of said load and responsively generates a desired load velocity signal. The error classifier determines an error between the desired load velocity and the actual velocity of the load, and generates a error signal. The load classifier determines a weight of said load and responsively generates a load signal. The valve transform curve manager determines a valve transform curve.

In yet another aspect of the present invention, a method for determining a valve transform curve in a fluid system is provided. The fluid system includes a valve and a fluid actuator, and initiates movement of a load. The method includes the steps of: determining a desired velocity of said load, determining a error value by comparing the actual velocity of the load with said desired velocity.

BEST MODE FOR CARRYING OUT THE INVENTION

Figure 1:
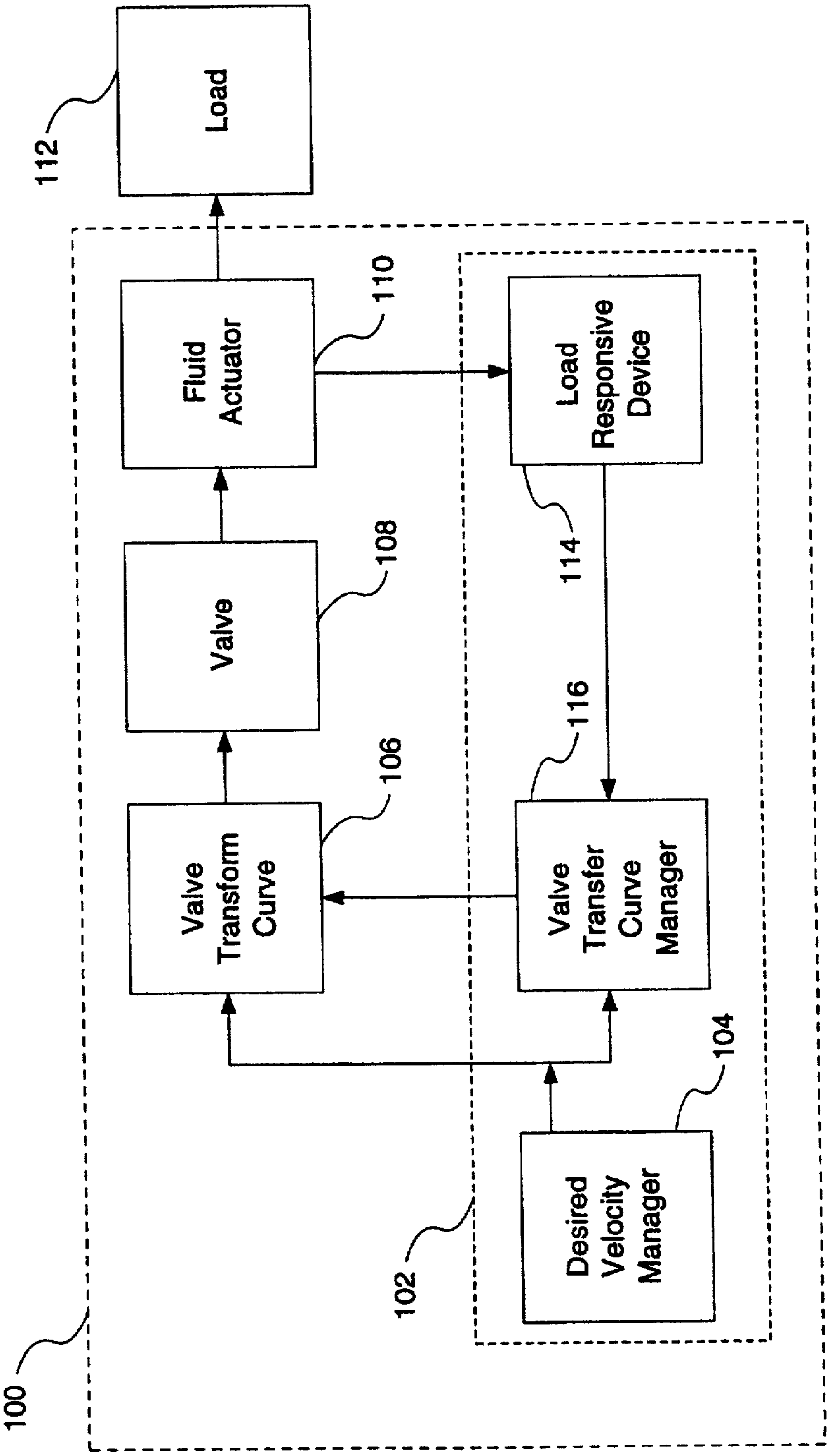
FIG. 1 is a high level diagram of fluid system containing an apparatus for determining a valve transform curve.
Figure 2:
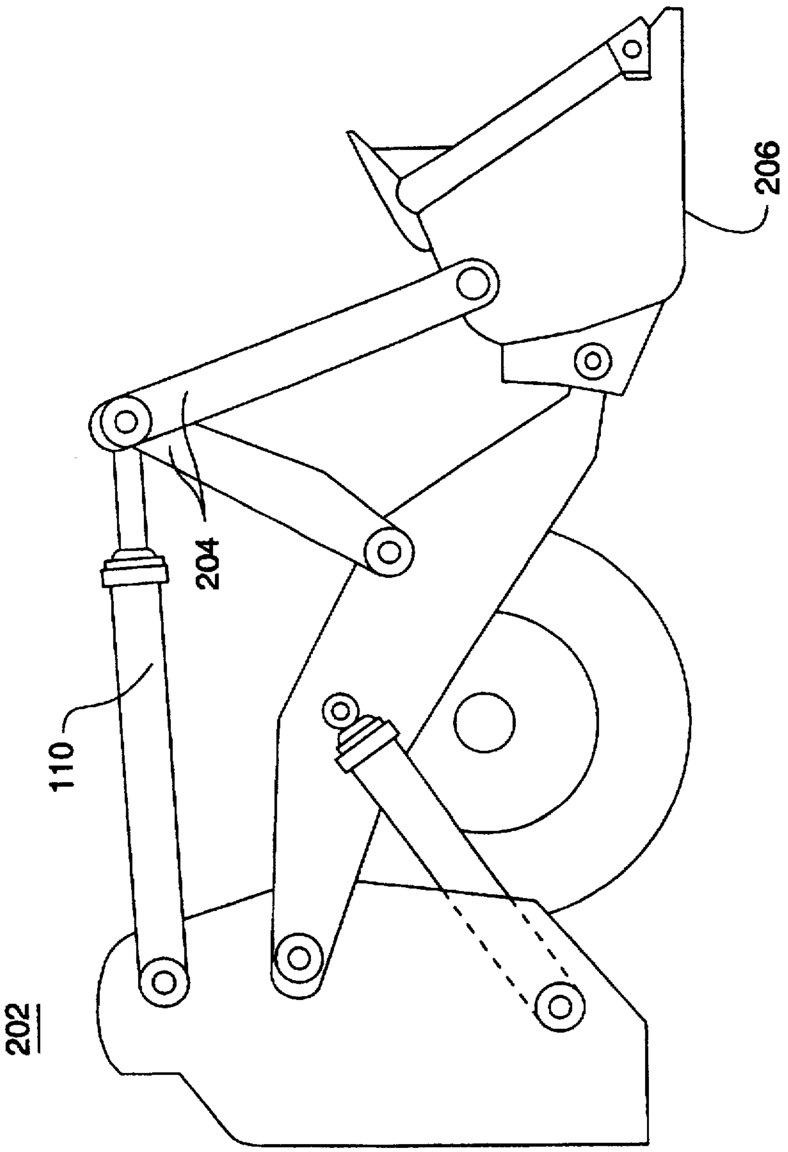
FIG. 2 is an illustration of the forward portion of a wheel loader.

With reference to FIG. 1, the present invention provides an apparatus 102 for determining a valve transform curve 106 in a fluid system 100. The fluid system 100 includes a valve 108 and a fluid actuator 110 arranged to initiate movement of a load 112. In the preferred embodiment the fluid system 100 is located on a mobile machine such as a wheel loader. FIG. 2 shows a forward portion of a wheel loader 202 having a payload carrier in the form of a bucket. Although the present invention is described in relation to a wheel loader, the present invention is equally applicable to many mobile machines such as track type loaders, hydraulic excavators, and other machines having similar loading implements. The bucket 206 is connected to a boom 204, which is connected to a pair of fluid actuators 110. The load 112 includes the bucket 206 and the boom 204.

Figure 3:
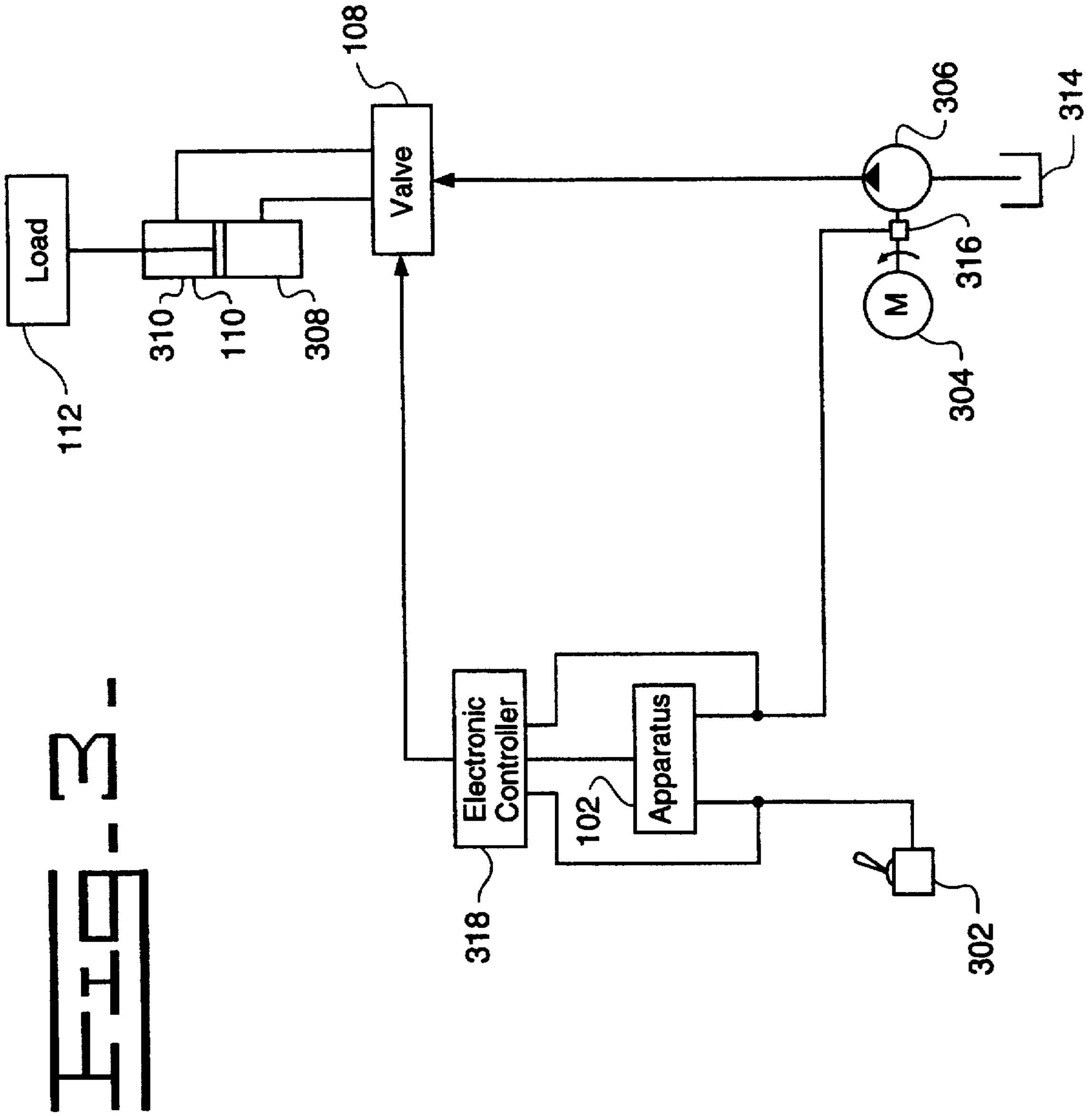
FIG. 3 is a diagram of one embodiment of the fluid system.

Referring now to FIG. 3, a diagram illustrating one example of an embodiment of the fluid system 100 is shown. In the preferred embodiment, the apparatus 102 receives signals from an load control input device 302, such as a joystick, and a pump input speed sensor 316. The pump input speed sensor 316 is located between an engine 304 and a pump 306. The engine 304 drives the pump 306, which delivers fluid to the fluid actuator 110 via the valve 108. The valve 108 controls fluid flow to the cylinder 110. The fluid flows through the valve 108, enters the head end 308 of the fluid actuator 110, and exits the rod end 310 of the fluid actuator 110. The apparatus 102 also receives sensor information, which will be described later, from the fluid actuator 110. The apparatus 102 determines an appropriate valve transfer curve 106 to use for controlling the valve 108. The apparatus 102 then delivers information regarding the valve transfer curve 106 to the electronic controller 318. The electronic controller 318 delivers an appropriate signal to the valve 108 to control the spool displacement (not shown) of the valve 108, which in turn, controls fluid flow to the fluid actuator 110.

Referring again to FIG. 1, the apparatus 102 includes a desired velocity manager 104, a load responsive device 114, and a valve transfer curve manager 116. The desired velocity manager 104 determines a desired velocity of the load 112, and responsively generates a desired load velocity signal. The desired load velocity, for example, includes the desired rack speed or the desired dump speed of the bucket 304.

The load responsive device 114 determines a characteristic of the load 112, and responsively generates a load signal. Examples of load characteristics include weight, position, and velocity.

The valve transform curve manager 116 receives the desired load velocity signal and the load signal and generates a valve transform curve in response to the magnitude of the signals.

The desired velocity manager 104 determines a desired velocity to move the load 112. The desired velocity is applied to the valve transform curve which determines the movement of the valve 108 that is necessary to achieve the desired velocity. The fluid flow is directed by the valve 108 to enter the fluid actuator 110, which initiates movement of the load 112. The load responsive device 114 monitors a characteristic of the load 112. The load characteristics include either the weight of the load 112, or the difference between the desired velocity and the actual velocity of the load 112. The load characteristic is then delivered to the valve transform curve manager 116. Based on the load characteristic, the valve transform curve manager 116 determines the appropriate valve transform curve 106.

The present invention is capable of operating in one of three modes: a run mode, an auto-calibration mode, and a combined mode. All three modes can operate in real time. The valve transform curve 106 is dynamically updated in real time, e.g., while the fluid system 100 is initiating movement of the load 112 in order to provide the appropriate valve transform curve 106 with respect to the desired velocity and load characteristics. The run mode and the auto-calibration mode are capable of running completely independent of each other.

Figure 4:
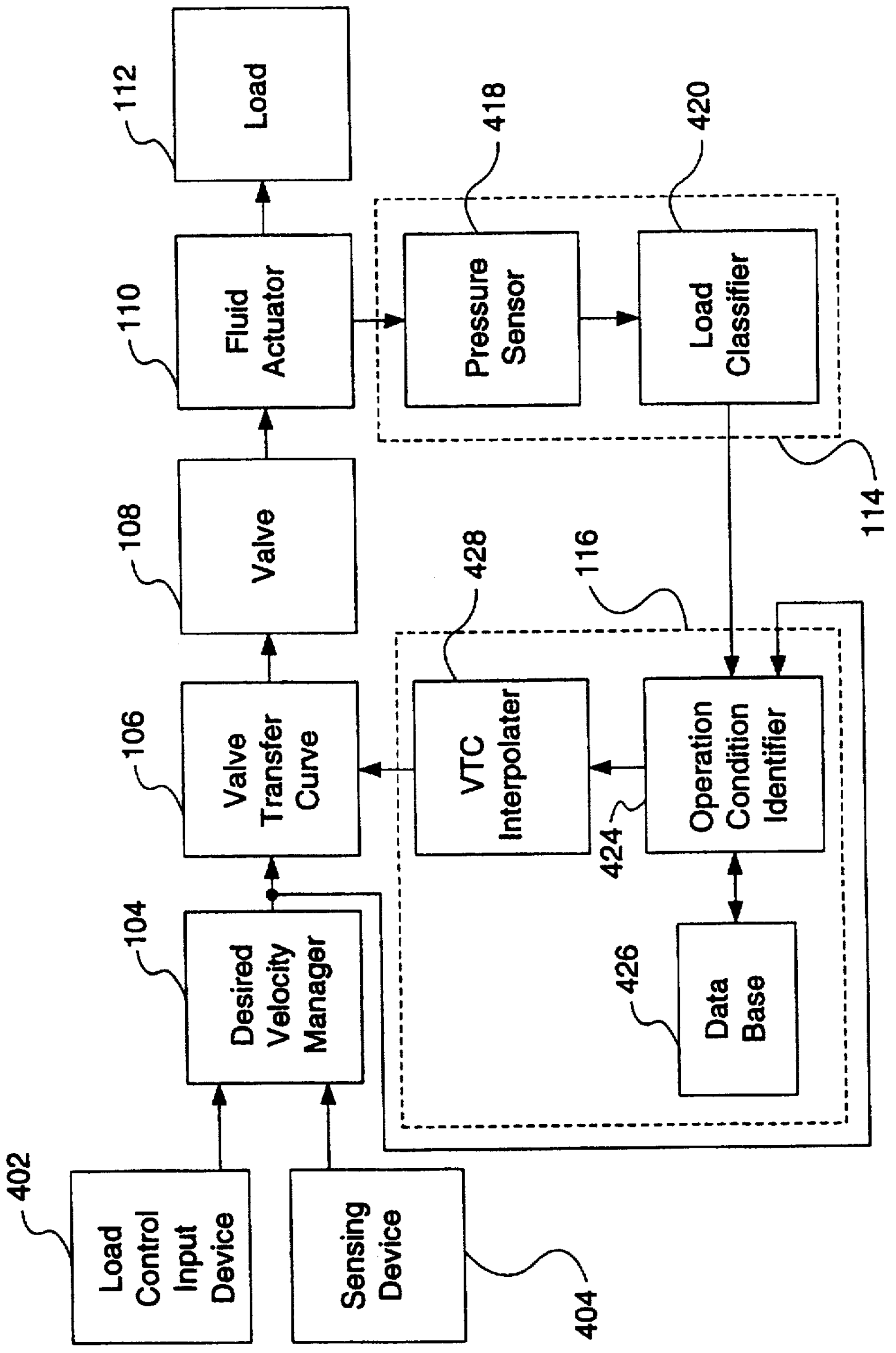
FIG. 4 is a high level diagram of the claimed invention during run mode.

Referring now to FIG. 4, the operation of the present invention is described in the run mode. In the preferred embodiment, the fluid system 100 includes a load control input device 402 adapted to generate a load control input signal. Examples of a load control input device 402 include a joystick, or a processor input if, for example, the fluid system 100 is operating in an autonomous manner.

The fluid system 100 additionally includes a sensing device 404 which is adapted to generate a flow signal responsive to fluid flow of the fluid system 100. An example of a sensing device 404 includes a pump input speed sensor 304, an engine speed sensor, or a fluid flow sensor.

The desired velocity manager 104 receives the load control input signal and the flow signal, and determines the desired velocity of the load 112. The load control input signal corresponds to a requested velocity. The maximum fluid flow of the system is determined from the flow signal. In the preferred embodiment, the pump input speed sensor 404 measures the input speed of a fixed displacement pump 306. The input speed signal is indicative of the current fluid displacement. If the requested velocity requires more fluid displacement than can be provided, then the requested velocity is limited to a maximum desired velocity.

Figure 5:
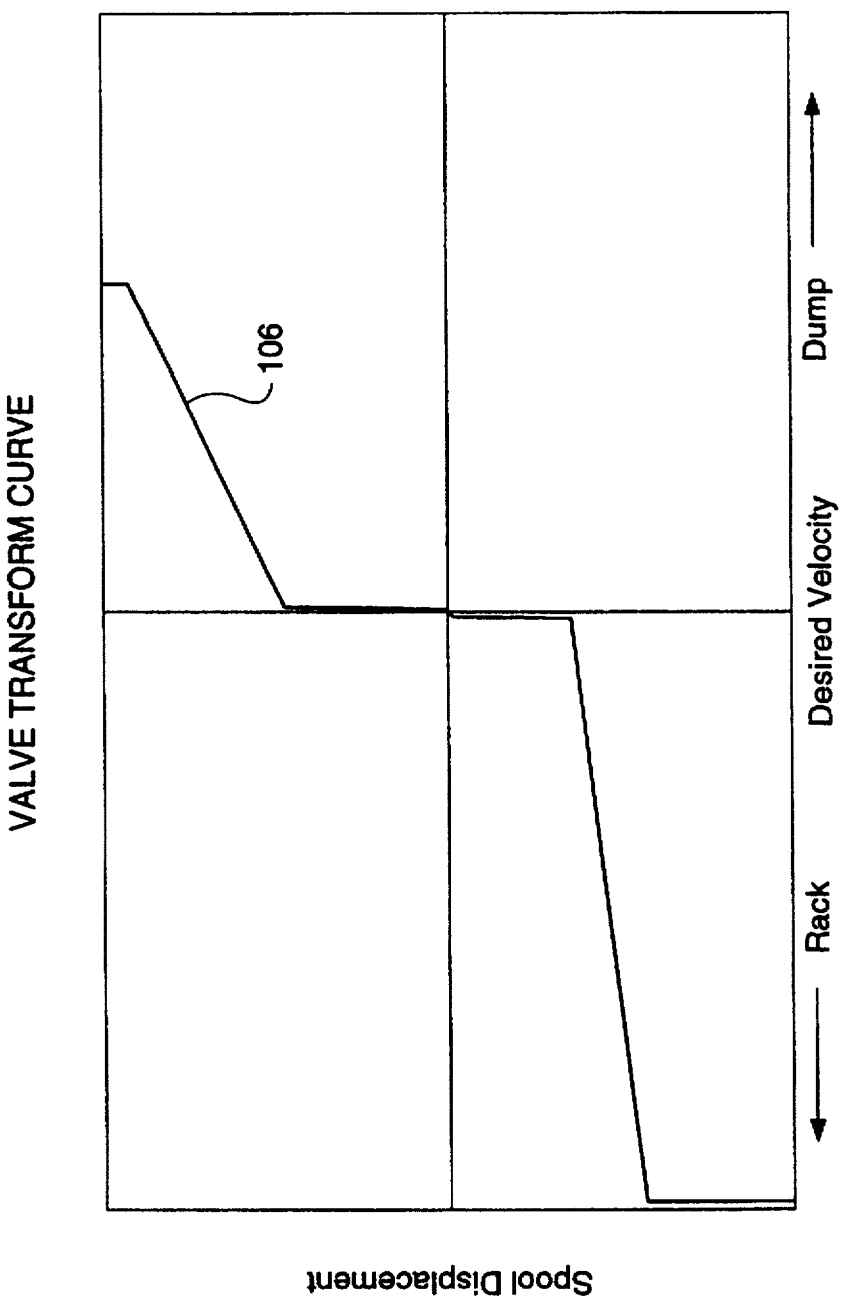
FIG. 5 is a diagram of a valve transform curve.

The desired load velocity signal is used in conjunction with the valve transform curve 106 to determine the amount of movement of the valve 108 needed to provide the desired velocity of the load 112. Specifically, in the preferred embodiment, the valve transform curve 108 indicates displacement of a spool (not shown) located within the valve 108 as a function of desired velocity, as shown in FIG. 5.

In the run mode, the load responsive device 114 includes two pressure sensors 418, one located at the head end 308 of the fluid actuator 110 and the other located at the rod end 310 of the fluid actuator 110. The load responsive device 114 also includes a load classifier 420 that receives the output of the two pressure sensors 418 and responsively determines a weight of the load 112. In the preferred embodiment the load classifier 420 includes a fuzzy logic algorithm. The load classifier 420, using inputs from the pressure sensors 418, first calculates the force being applied to the fluid actuator 110, using the following equation:

Force=P_he * A_he−P_re * A_re where:

P_he=the head pressure (received from the pressure sensor 418)

P_re=the rod pressure (received from the pressure sensor 418)

A_he=the area of the head 308

A_re=the area of the rod 310

In the preferred embodiment, there is a positive load value on the head end of the fluid actuator 110, and a negative load value on the rod end of the fluid actuator 110.

Figure 6:
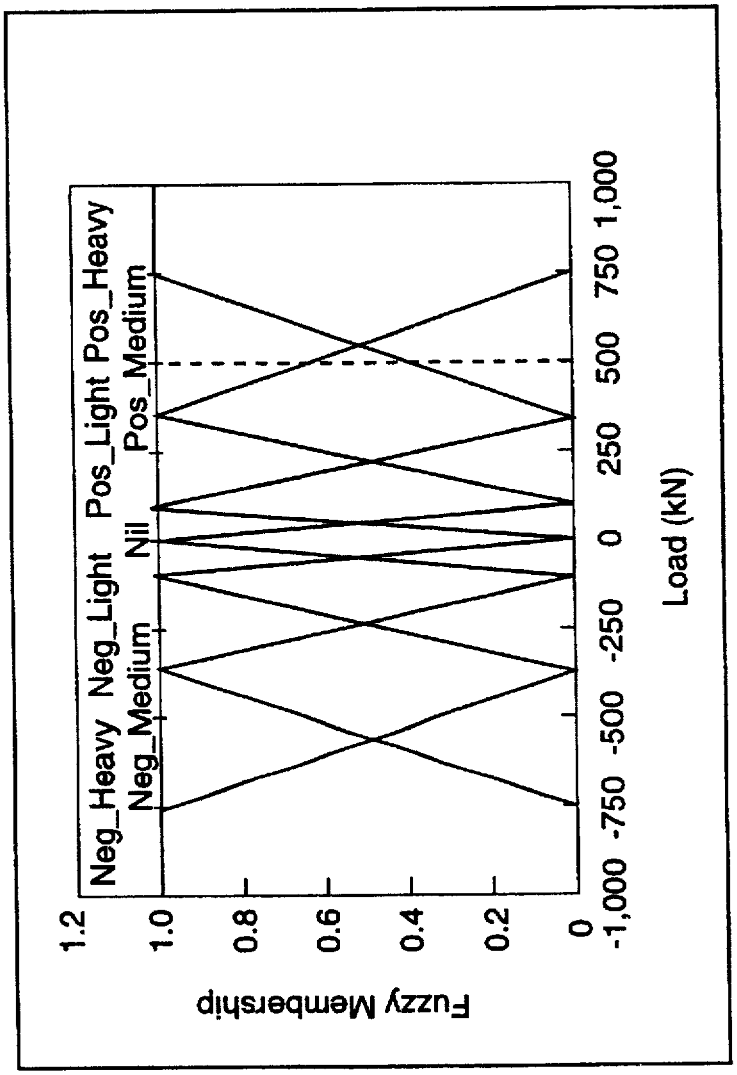
FIG. 6 is a diagram of a fuzzy map used to quantizize the fluid actuator force and provide load classifications.

Then a fuzzy map, shown in FIG. 6, is used to quantizize the fluid actuator force and provide load classifications used in later processing. The fuzzy map is used to map the fluid actuator force as a function of load levels and the associated certainty of that load level in response to the fluid actuator force. For example, assuming that the fluid actuator force is 500 kN, the resulting load classification after the fluid actuator force has been applied to the fuzzy map is: Positive_Medium with 65% certainty, and Positive_Heavy, with 35% certainty. There are seven possible load levels, indicating the different weight classifications, light, medium, or heavy, and whether the fluid actuator force was positive or negative.

The output of the load classifier 420 is a load signal containing the load level and associated certainty of the value. For example, the load signal would include: Positive_Medium, 0.65 and Positive_Heavy, 0.35 as the two possible load values. In this example there are two possible load values, therefore both possible values are used for further calculations. The load signal is delivered to the valve transform curve manager 116.

The valve transform curve manager 116 receives the load signal, and the desired load velocity signal, and responsively determines the appropriate valve transform curve 106 to be used by the fluid system 100. The valve transform curve manager 116 includes an operation condition identifier 424, a database 426, and a valve transform curve interpolator 428. The operation condition identifier 424 receives the load and desired velocity signals and selects the appropriate valve transform curves from a database 426 that contains a plurality of valve transform curves.

Figure 7:
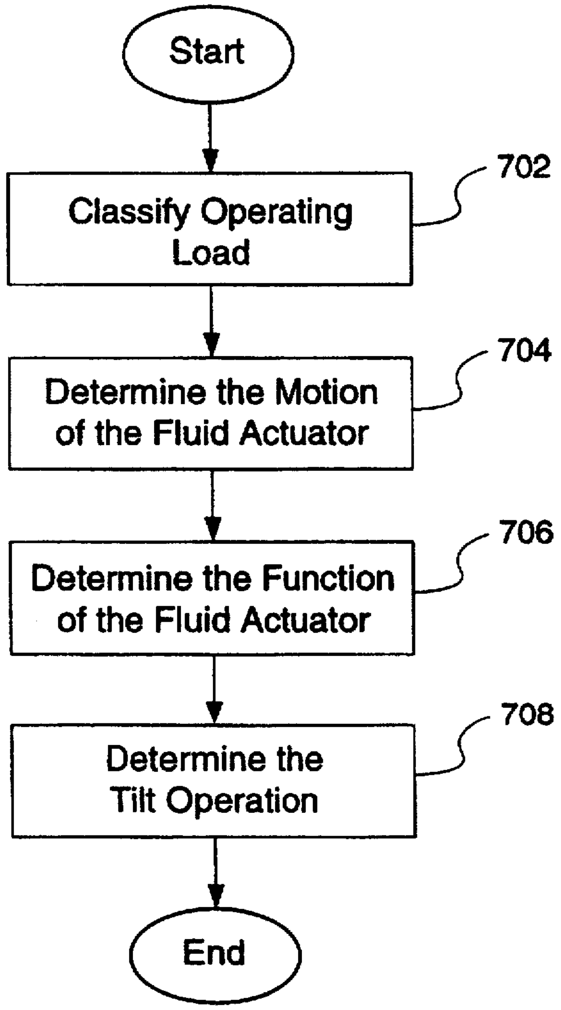
FIG. 7 is a flow diagram of a method implementing a operation condition identifier.

FIG. 7 illustrates one method of implementing the operation condition identifier 424. In a first control block 702 the operating load is classified as being either low, medium or high, and the direction of the load is classified as being either positive or negative. In a second control block 704 the motion of the fluid actuator 110 is determined, i.e., either a rack motion, a dump motion, or no motion. The motion of the fluid actuator 110 is determined by comparing the desired velocity with a specified value. If the desired velocity is less than the absolute value of the specified value, then the fluid actuator 110 is determined not to be in motion, and the cylinder function is determined to be not in action. Otherwise, if the desired value is greater than the specified value, then the fluid actuator motion is determined to be a rack. If the desired value is less than the specified value, then the fluid actuator motion is determined to be a dump. In a third control block 706 the cylinder function is determined to be either overrun, resistive, or transient.

In a fourth control block 708, the tilt operation is determined. For example, if the cylinder function is a resistive rack, and the operational load is heavy, then the tilt operation is a light dump and a heavy rack.

Figure 8:
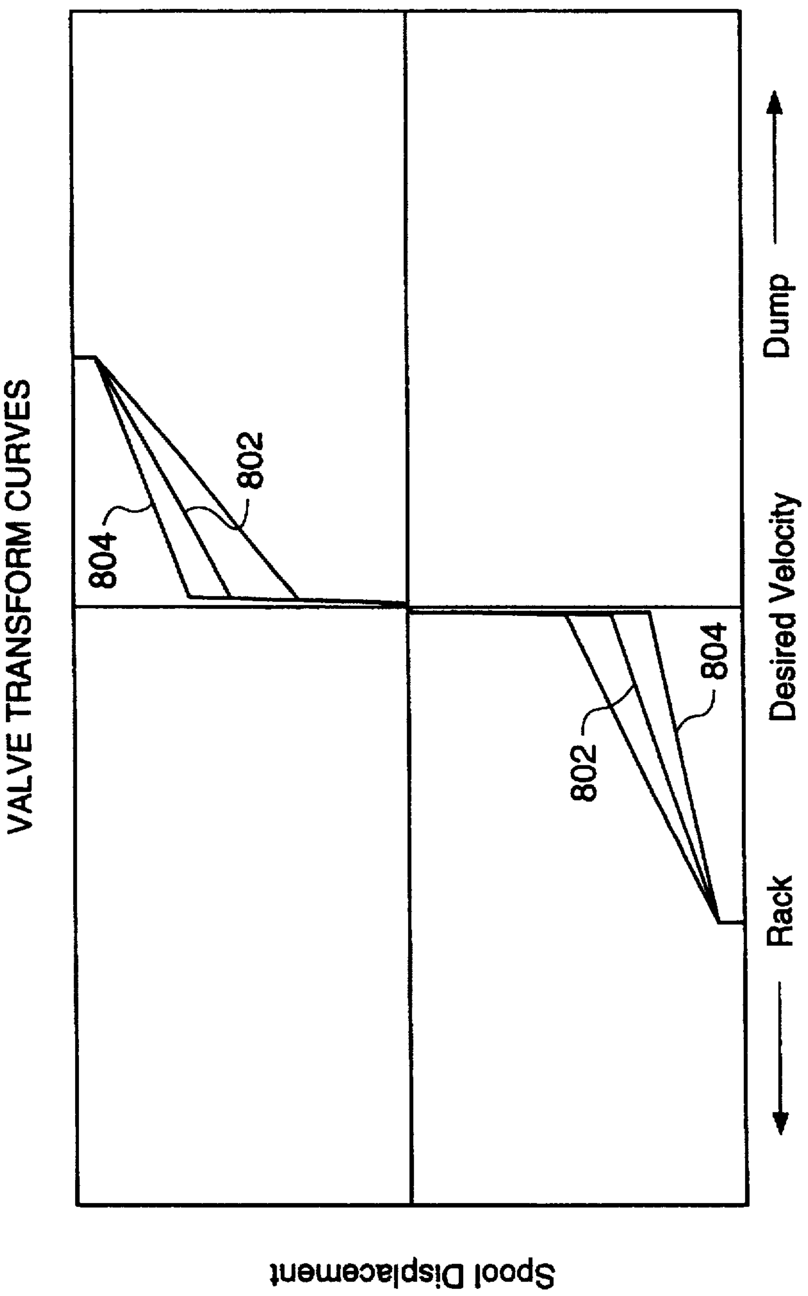
FIG. 8 is a diagram of three valve transform curves.

Each of the tilt operations is then used to select an appropriate valve transform curve from a database 426 of valve transform curves. An example of a database of valve transform curves is shown in FIG. 8. For example, given an input of:

Tilt Operation: Light_rack, Medium Dump

Fluid Actuator Function: Resistive Dump the appropriate valve transform curve 802 is selected. Given an input of:

Tilt Operation: Light_rack, Heavy Dump

Figure 9:
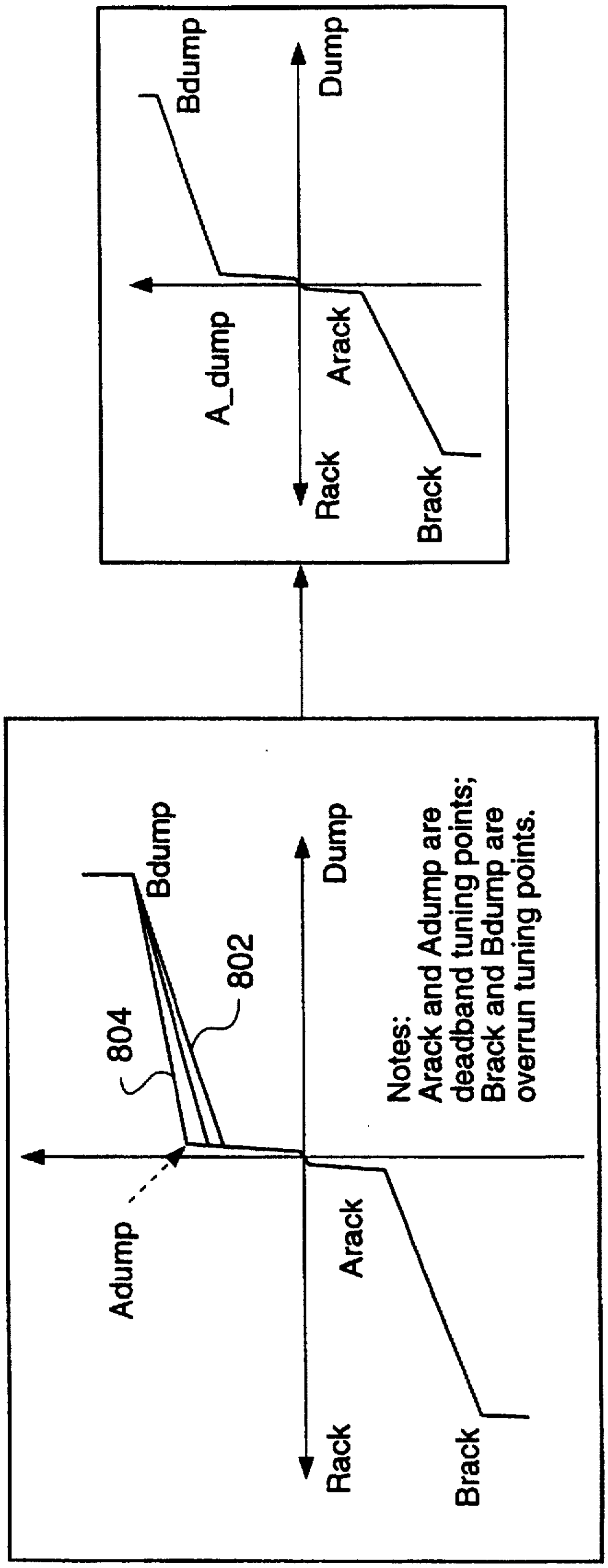
FIG. 9 is a diagram illustrating the interpolation of two valve transform curves.

Cylinder Function: Resistive Dump the appropriate valve transform curve 804 is selected. Therefore given two potential load values, two potential valve transform curves with associated certainty levels are selected. These two curves 802, 804 are then passed to the valve transform interpolator 428. The valve transform interpolator 428 interpolates the two potential valve transform curves 802, 804, using their associated certainty levels, as shown in FIG. 9. The deadband tuning points, and the overrun tuning points are then interpolated. For example:

A_dump=0.35 * Ahvy_dump+0.65 * Amed_dump.

Adump_exe is the interpolated dump tuning point

Ahvy_dump is the heavy load dump tuning point

Amed_dump is the medium load dump tuning point

The result of the interpolation is a single curve which is used by the fluid system 100 as the valve transform curve 106.

Figure 10:
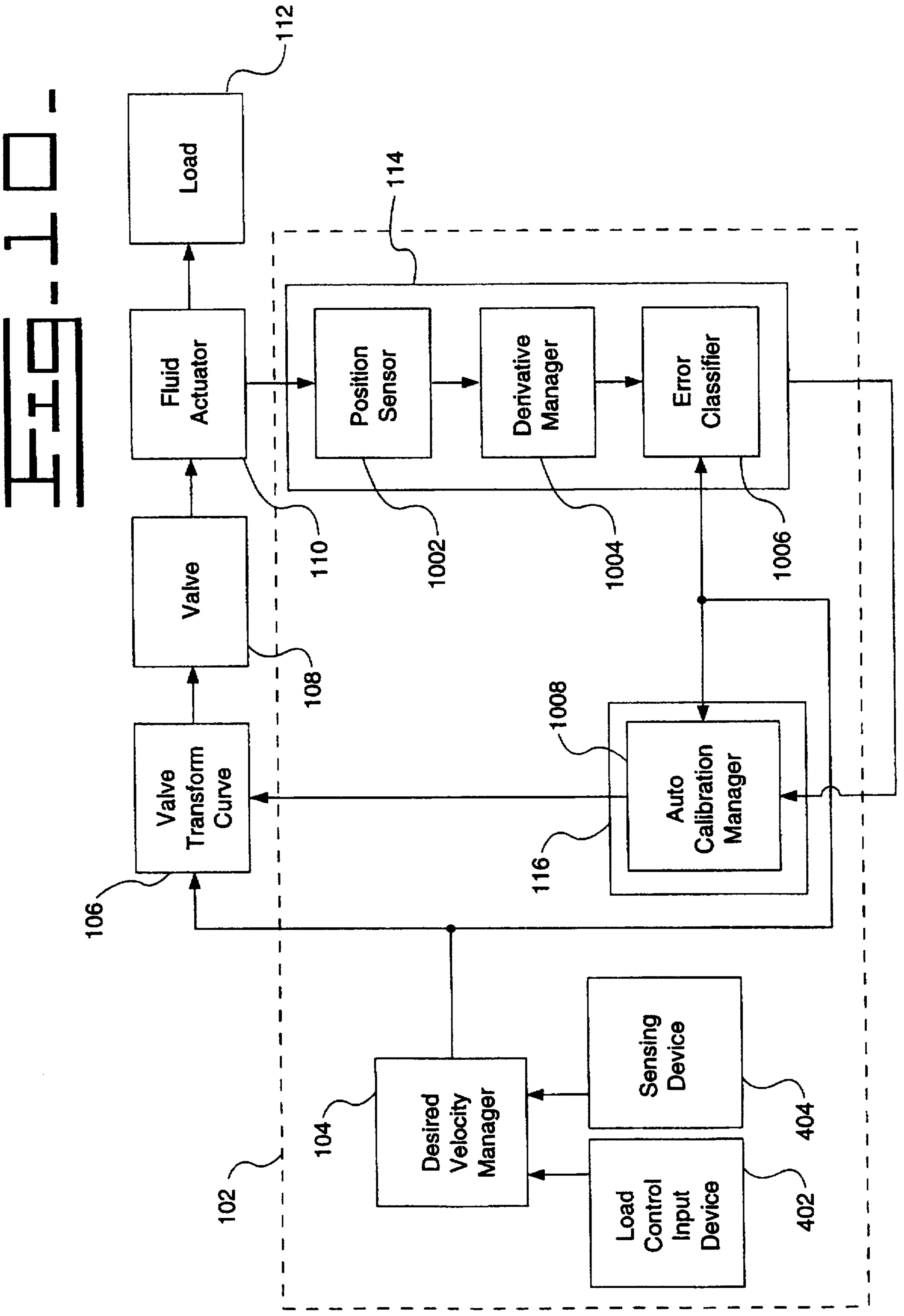
FIG. 10 is a high level diagram of the claimed invention during auto calibration mode.
Figure 11:
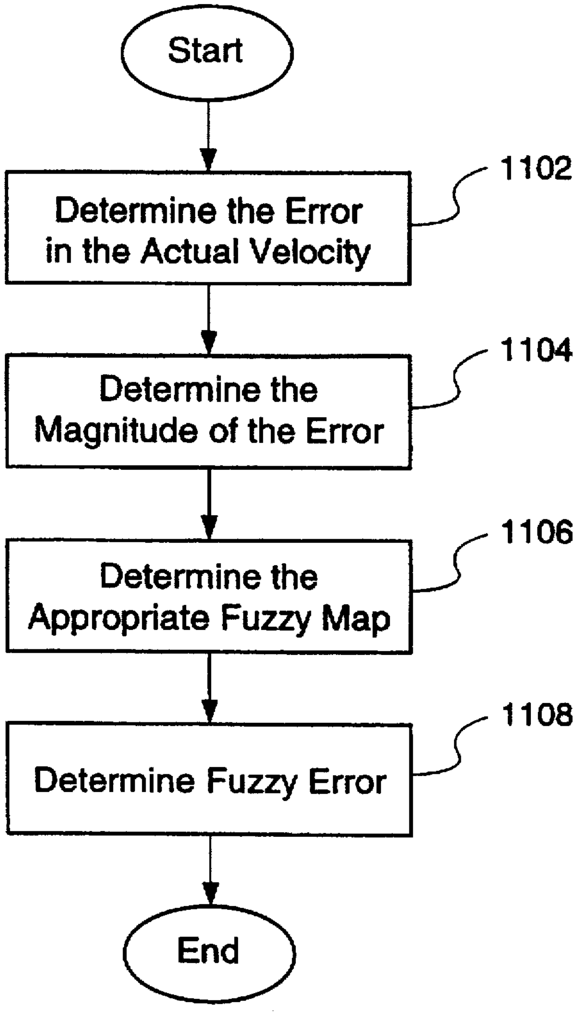
FIG. 11 is a flow diagram of a method implementing an error classifier.
Figure 12:
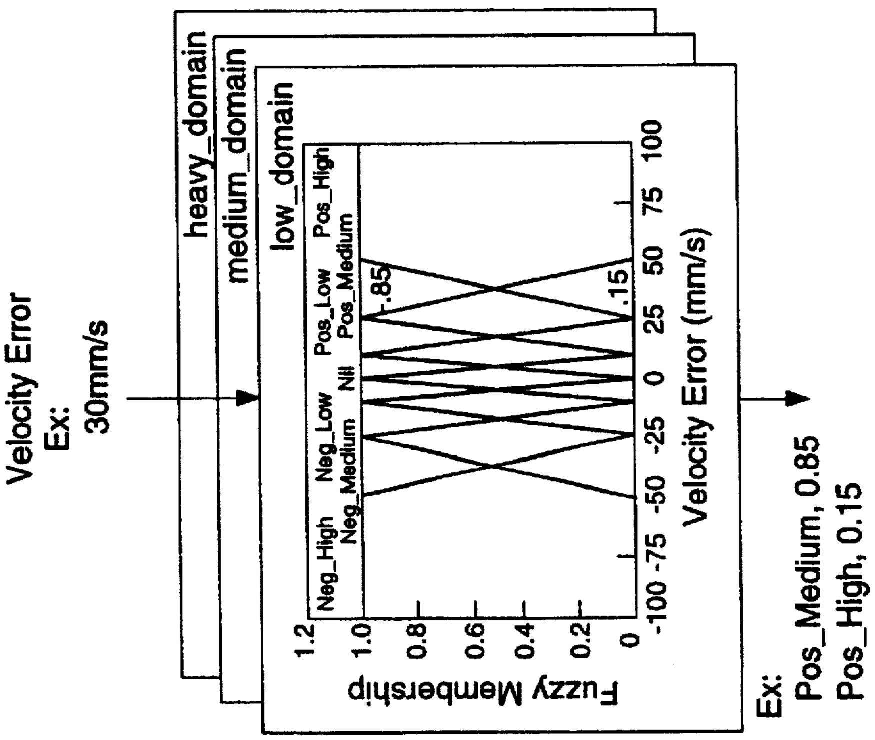
FIG. 12 is a diagram of a three fuzzy map used to quantizize the load velocity and provide error classifications.

One embodiment of the present invention during the auto-calibration mode is shown in FIG. 10. In the auto-calibration mode, the load responsive device 114 includes a position sensor 1002, a derivative manager 1004, and an error classifier 1006. The position sensor 1002 is capable of measuring either directly or indirectly, the relative extension of the fluid actuator 110. In the preferred embodiment the position sensor 1002 is a rotary potentiometer. However, other embodiments include radio frequency (RF) sensors disposed within the fluid actuator. The derivative manager 1004 receives the output of the position sensor 1002 and takes the derivative of the position value in order to determine a velocity value of the load 112, and generate a velocity signal. The error classifier 1006 receives the actual velocity signal and the desired velocity signal and responsively determines the error between the desired and actual velocities. FIG. 11 illustrates one embodiment of an error classifier 1006. In a first decision block 1102 the error of the velocity of the bucket 206 is determined. The error is determined by subtracting the actual velocity from the desired velocity. In a second decision block 1104 the magnitude of the error is quantizized as being low, medium or heavy. In a third decision block 1406 an appropriate fuzzy map is selected which represents the velocity error relative to the magnitude of the error. For example, in FIG. 12, if the error is classified as low, then the fuzzy map representing low velocity error is selected. The velocity error is then mapped onto the fuzzy map to determine the error level and certainty of the error level. For example if the error is 30 mm/s then the resulting error is determined to be a medium error of positive value with 85% certainty, and a high error of positive value with 15% certainty. There are two possible velocity error levels, therefore both possible levels are used for further calculations. These error levels are then delivered to the auto-calibration manager 1008.

Figure 13:
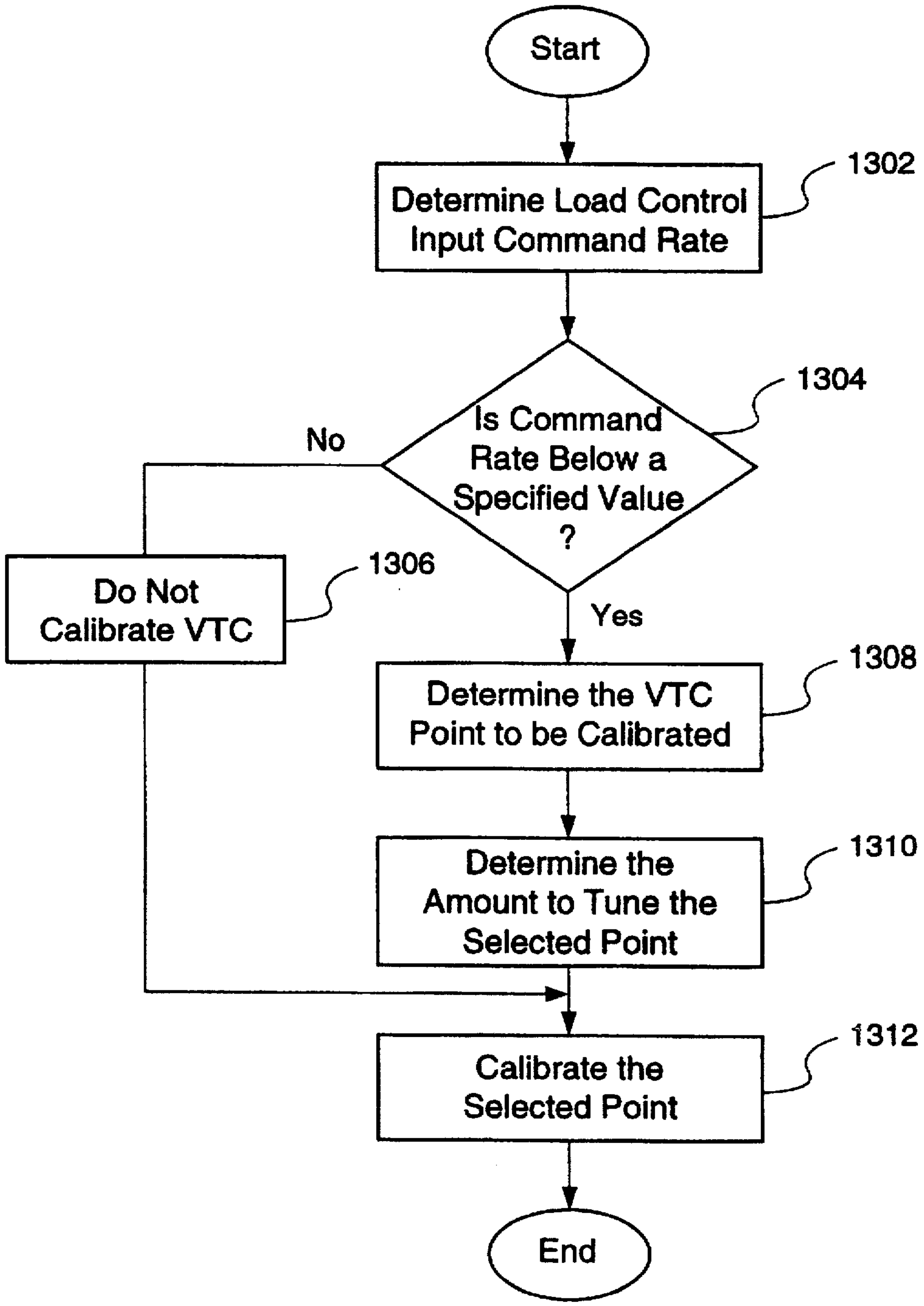
FIG. 13 is a flow diagram of a method implementing a auto calibration manager.

FIG. 13 illustrates one method of implementing the auto-calibration manager 1008. In a first control block 1302 the load control input command rate is determined. In a first decision block 1304 the command rate is compared with a specified value. The command rate is compared to a specified value to prevent false errors. For example, if the load control input device 104 goes from being inactive to a large value essentially instantaneously, there will inherently by a velocity error. This velocity error is not due to the valve transform curve, but rather due to the rate of command of the input desired velocity. Therefore, the command rate classifier 1302 ensures that the rate of change in the desired velocity is slow enough such that it will not cause a false error in the determination of a velocity transform curve. This determination is made by taking the derivative of the desired velocity to determine if the rate of change exceeds a specified value. If the command rate exceeds the specified value, then control passes to a second control block 1306 where the determination is made not to calibrate the valve transform curve 108.

Figure 14:
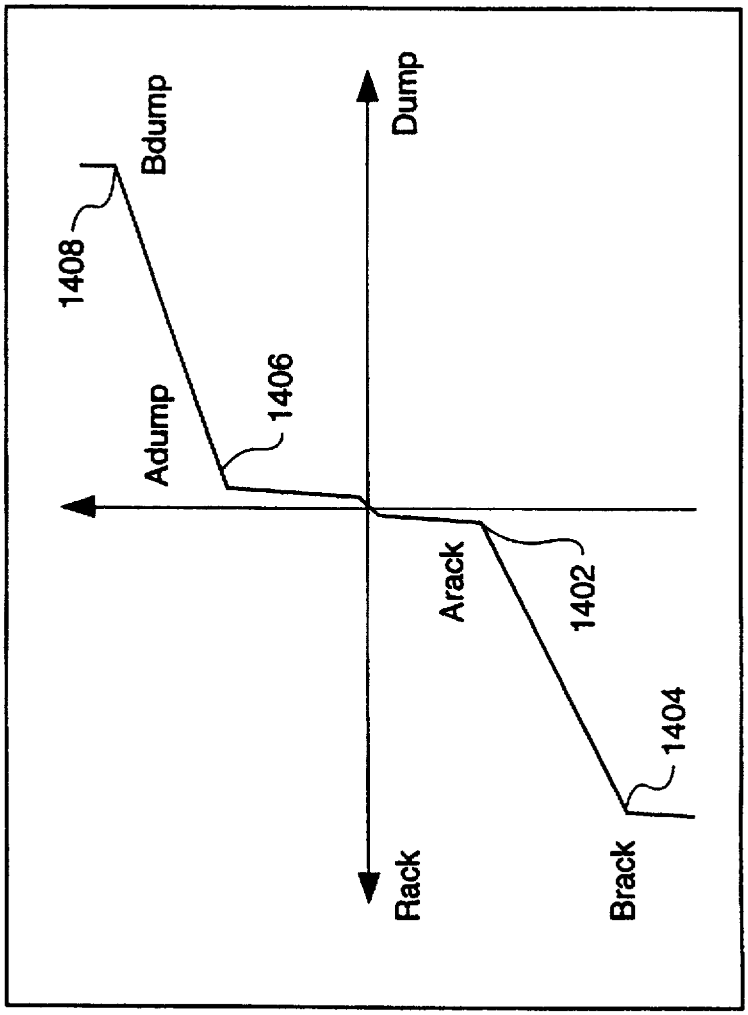
FIG. 14 is a diagram of a valve transform curve with the potential tuning points.

If the command rate falls below a specified value, then control passes to a third control block 1308 where a determination is made as to which point on the valve transform curve 108 to calibrate. If the desired velocity is less than a velocity tolerance then no point is tuned. Otherwise, based on the value of the desired velocity, the appropriate point to tune is selected. FIG. 14 illustrates the potential points to be calibrated on the valve transform curve, Arack 1402, Brack 1404, Adump 1406, Bdump 1408.

Figure 15:
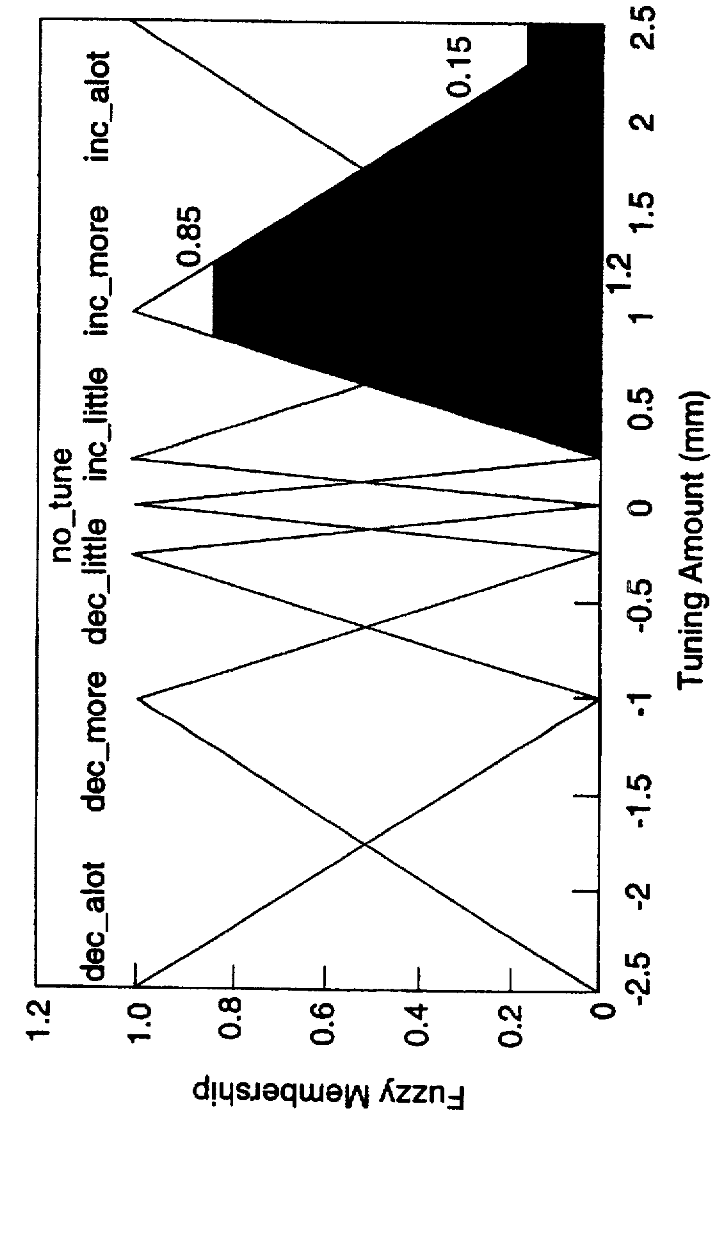
FIG. 15 is a diagram of a fuzzy map used to determine the amount needed to tune the valve transform curve.

Control then passes to a fourth control block 1320 where the amount to tune the selected point is determined. This is done by first determining whether the tuning point is zero indicating that no tuning is necessary. Then, based on the value of the error and whether a dump or rack point is involved, a determination is made as to the magnitude of the tuning needed: no tuning, increase (the point) a little, increase more, increase a lot, decrease a little, decrease more, decrease a lot. Then, using the fuzzy map shown in FIG. 15, determine the tuning amount. For example, a pos_medium of probability 0.85 and a tune point of A_dump leads to a tune magnitude of increase more with 0.085 probability, and a pos_high of certainty 0.15 and a tuning point of A_dump leads to a tune value of increase a lot, with 0.15 certainty. Then interpolate the two points based on there associated strengths.

Tuning_pt=(0.85 * Tuning_pt_1)+(0.15 * Tuning_pt_2)

This determines the tuning amount.

Figure 16:
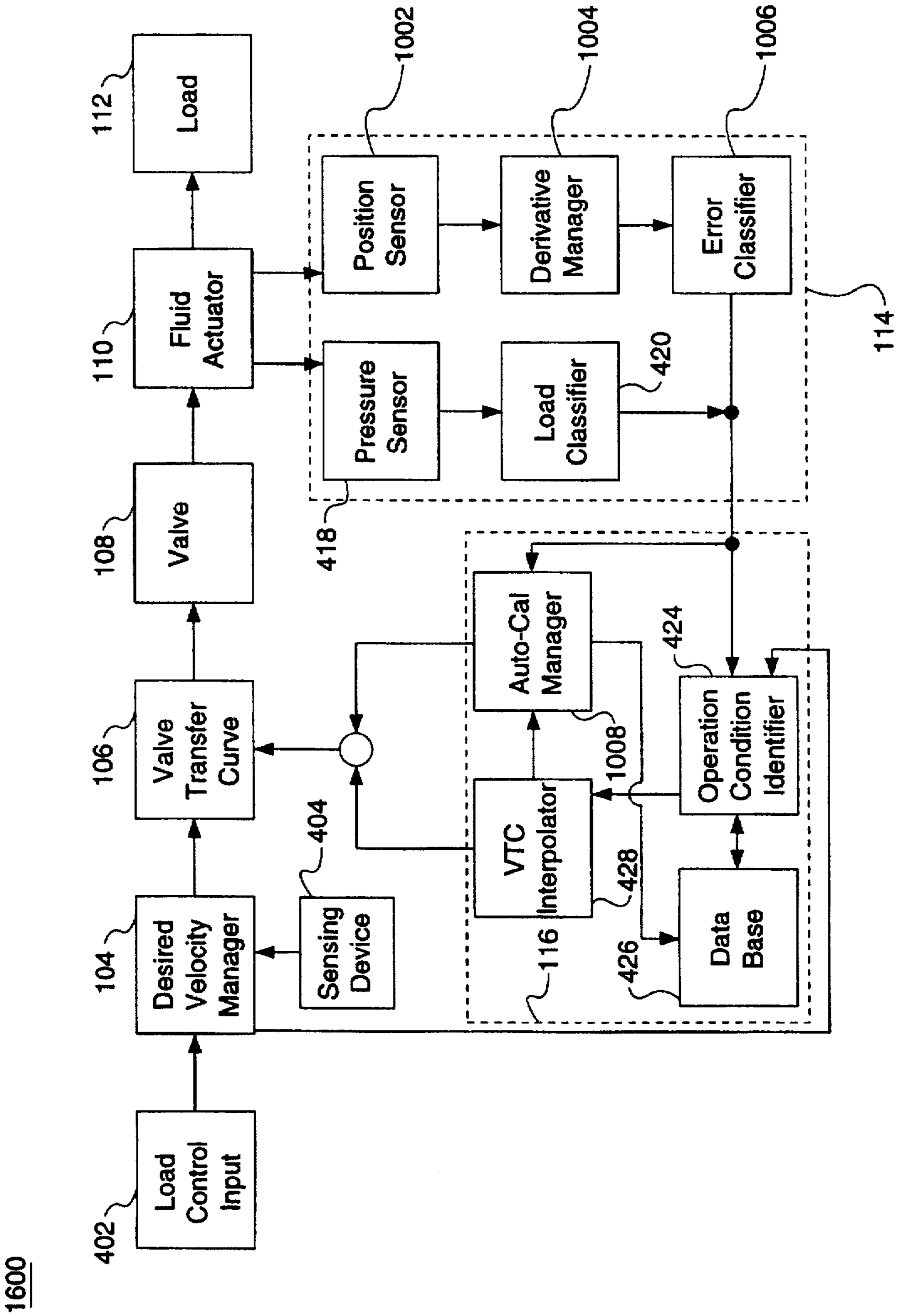
FIG. 16 a high level diagram of the claimed invention during the combined mode.

Control then passes to a fifth control block 1312 where the selected point is calibrated. Calibration is performed by adding the calibration FIG. 16 illustrates the embodiment of the present invention during the combined mode. In the combined mode, the fluid system 100 includes a pressure sensor 418, a position sensor 1002, a load classifier 420, a derivative manager 1004, and a error classifier 1006. These elements work as described individually in the run mode and the auto-calibration mode. The load classifier 420 generates a load signal containing information regarding the weight of the load 112, and the error classifier 1006 generates a load signal containing information regarding the error in the velocity of the load 112.

In the combined embodiment, the valve transform curve manager 116 includes an operation condition identifier 424, a database 426, a valve transform curve interpolator 428, and a auto-calibration manager 1308.

The operation works the same except that the valve transform curve interpolator 428 sends a valve transform curve 106 to the auto-calibration manager 1308 and the auto-calibration manager 1008 makes the necessary modifications and then this valve transform curve is used as the new valve transform curve 108.

The combined embodiment, the apparatus 102 also has the ability to update the database 426. Upon completing the calibration of the valve transform curve 108, the calibrated curve is stored in the database 426.

INDUSTRIAL APPLICABILITY

Mobile machines such as wheel type loaders include fluid systems capable of initiating movement of a load. The fluid system should be able to provide a consistent and predictable response to requested inputs, regardless of load amounts. The present invention provides an apparatus and a method for dynamically determining a valve transform curve in a fluid system used to initiate movement of a load.

FIG. 2 illustrates an example of a mobile machine 202 which may incorporate the fluid system 100 disclosed in this invention. The load 112 is illustrated by the bucket 206 which is tilted by a cylinder 110. The mobile machine 202, in FIG. 2 is a wheel type loader machine, however, the present invention is equally applicable to many mobile machines such as track type loaders, hydraulic excavators, and other machines having similar loading implements.

The desired velocity manager 104 determines a desired velocity to move the load 112. The desired velocity is applied to the valve transform curve which determines the movement of the valve 108 that is necessary to achieve the desired velocity. The fluid flow is directed by the valve 108 to enter the fluid actuator 110, which initiates movement of the load 112. The load responsive device 114 monitors a characteristic of the load 112. The load characteristics include either the weight of the load 112, or the difference between the desired velocity and the actual velocity of the load 112. The load characteristic is then delivered to the valve transform curve manager 116. Based on the load characteristic, the valve transform curve manager 116 determines the appropriate valve transform curve 106.

The present invention is capable of operating in one of three modes: a run mode, an autocalibration mode, and a combined mode. All three modes can operate in real time. The valve transform curve 106 is dynamically updated in real time, e.g., while the fluid system 100 is initiating movement of the load 112 in order to provide the appropriate valve transform curve 106 with respect to the desired velocity and load characteristics. The run mode and the auto-calibration mode are capable of running completely independent of each other.

It should be understood that while the function of the preferred embodiment is described in connection with the fluid system, the present invention is readily adaptable to dynamically determine the valve transform curve used in other fluid systems. For example, the system could be used on track type loaders, hydraulic excavators, backhoes, and similar machines capable of moving a load.

Other aspects, objects and advantages of the present invention can be obtained from a study of the drawings, the disclosure and the appended claims.

We claim:

1. An apparatus for determining a valve transform curve in a fluid system, the fluid system having a valve and a fluid actuator arranged to initiate movement of a load, comprising:

a desired velocity manager adapted to determine a desired velocity of said load and responsively generate a desired load velocity signal;

a load responsive device adapted to determine a characteristic of said load and responsively generate a load signal; and a valve transform curve manager adapted to receive said desired load velocity signal and said load signal and responsively determine a valve transform curve.

2. An apparatus, as set forth in claim 1, wherein said fluid system includes a load control input device adapted to generate a load control input signal.

3. An apparatus, as set forth in claim 1, wherein said fluid system includes a sensing device, said sensing device being adapted to generate a flow signal responsive to fluid flow of the fluid system.

4. An apparatus, as set forth in claim 3, wherein said sensing device includes a pump input speed sensor.

5. An apparatus, as set forth in claim 1, wherein said fluid system includes a load control input device and a sensing device, said load control input device adapted to generate a load control input signal, said sensing device being adapted to generate a flow signal responsive to fluid flow of the fluid system, said desired velocity manager being adapted to receive said load control input signal and said flow signal and responsively determine said desired velocity.

6. An apparatus, as set forth in claim 1, wherein said load responsive device includes a load classifier adapted to determine a weight of said load.

7. An apparatus, as set forth in claim 6, wherein said load responsive device includes at least one sensor, said at least one sensor adapted to generate a sensor signal corresponding to said weight of said load.

8. An apparatus, as set forth in claim 7, wherein said fluid actuator includes a first port and a second port.

9. An apparatus, as set forth in claim 8, wherein said at least one sensor is a first and second pressure sensor, and said first pressure sensor is adjacent to said first port of said fluid actuator, and said second pressure sensor is adjacent to said second port of said fluid actuator.

10. An apparatus, as set forth in claim 6, wherein said load classifier includes a fuzzy logic algorithm, said fuzzy logic algorithm being adapted to receive at least one sensor signal and responsively determine said weight of said load and generate said load signal.

11. An apparatus, as set forth in claim 1, wherein said valve transform manager includes a database, said database containing a plurality of predetermined valve transform curves.

12. An apparatus, as set forth in claim 11, wherein said valve transform manager includes a operation condition identifier, said operation condition identifier being adapted to receive said desired load velocity signal and said load signal and responsively select at least one valve transform curve from said database, and generate a valve transform curve signal.

13. An apparatus, as set forth in claim 12, wherein said valve transform manager includes a valve transform curve interpolator, wherein said valve transform curve interpolator is adapted to receive said valve transform curve signal and interpolate said at least one valve transform curve to generate said valve transform curve.

14. An apparatus, as set forth in claim 1, wherein said fluid system includes a fixed displacement pump.

15. An apparatus, as set forth in claim 1, wherein said valve includes a open center valve.

16. An apparatus, as set forth in claim 2, wherein said load control input device includes a joystick.

17. An apparatus, as set forth in claim 1, wherein said load responsive device includes an error classifier adapted to receive said desired load velocity signal, determine a actual velocity of said load, compare said desired load velocity to said actual velocity, and responsively determine an error based on said comparison, and generate said load signal.

18. An apparatus, as set forth in claim 17, wherein said load responsive device includes at least one sensor, said at least one sensor adapted to generate a position signal corresponding to a position of said load.

19. An apparatus, as set forth in claim 18, wherein said at least one sensor is a position sensor.

20. An apparatus, as set forth in claim 19, wherein said load responsive device includes a derivative manager adapted to receive said position signal and responsively generate a actual velocity signal.

21. An apparatus, as set forth in claim 20, wherein said error classifier includes a fuzzy logic algorithm, said fuzzy logic algorithm being adapted to receive said actual velocity signal and said desired load velocity signal and responsively determine said error of said actual velocity and generate said error signal.

22. An apparatus, as set forth in claim 21, wherein said valve transform manager is an auto-calibration manager, said auto-calibration manager adapted to receive said error signal and said desired load command signal and responsively modify said valve transform curve.

23. An apparatus, as set forth in claim 18, wherein said load includes an implement being controlled by a boom and stick.

24. A method for determining a valve transform curve in a fluid system, the fluid system having a valve and a fluid actuator adapted to initiate movement of a load, including the steps of:

determining a desired velocity of said load;

determining a characteristic of said load; and determining a valve transform curve in response to said desired velocity of said load and said characteristic of said load.

25. A method, as set forth in claim 24, wherein determining said desired velocity includes the steps of:

determining a load control input value;

determining a pump input speed value; and generating a desired load velocity in response to said load control input value and said pump input speed value.

26. A method as set forth in claim 24, wherein determining said characteristic of said load includes the steps of:

sensing a pressure of said fluid actuator;

determining a weight of said load in response to said pressure.

27. A method as set forth in claim 26, wherein determining said weight of said load in response to said pressure includes the step of utilizing a fuzzy logic algorithm to determine said weight of said load.

28. A method, as set forth in claim 27, wherein determining said valve transform curve includes the steps of:

selecting at least one valve transform curve from a database of valve transform curves in response to said weight of said load and said desired load velocity value; and interpolating said at least one valve transform curve and generating a final valve transform curve.

29. A method as set forth in claim 24, wherein determining said characteristic of said load includes the steps of:

sensing a position of said load;

determining a actual velocity of said load in response to said pressure;

comparing said desired load velocity with said actual velocity and responsively generating a error value.

30. A method as set forth in claim 29, wherein determining said actual velocity of said load in response to said position includes the step of utilizing a fuzzy logic algorithm to generate said error value.

31. A method, as set forth in claim 30, wherein determining said valve transform curve includes the step of:

calibrating said valve transform curve in response to said desired load velocity and said error value.

32. An apparatus for determining a valve transform curve in a fluid system, the fluid system having a valve, and a fluid actuator arranged to initiate movement of a load, comprising:

a desired velocity manager adapted to determine a desired velocity of said load and responsively generate a desired load velocity signal;

an error classifier adapted to receive said desired load velocity signal, determine a actual velocity of said load, compare said desired velocity with said actual velocity, responsively determine an error between said desired load velocity and said actual velocity, and generate a error signal;

a load classifier adapted to determine a weight of said load and responsively generate a load signal; and a valve transform curve manager adapted to receive said desired load velocity signal, said load signal, and said error signal, and responsively determine a valve transform curve.

33. An apparatus, as set forth in claim 32, wherein said fluid system includes a load control input device adapted to generate a load control input signal.

34. An apparatus, as set forth in claim 32, wherein said fluid system includes a sensing device, said sensing device being adapted to generate a flow signal responsive to fluid displacement of the fluid system.

35. An apparatus, as set forth in claim 34, wherein said sensing device includes a pump input speed sensor.

36. An apparatus, as set forth in claim 32, wherein said fluid system includes a load control input device and a sensing device, said load control input device adapted to generate a load control input signal, said sensing device being adapted to generate a flow signal responsive to fluid flow of the fluid system, said desired velocity manager being adapted to receive said load control input signal and said flow signal and responsively determine said desired velocity.

37. An apparatus, as set forth in claim 32, wherein said load classifier includes at least one sensor, said at least one sensor adapted to generate a sensor signal corresponding to said load.

38. An apparatus, as set forth in claim 37, wherein said fluid actuator includes a first port and a second port, and said at least one sensor is a first and second pressure sensor, said first pressure sensor being located at said first port of the fluid actuator, and said second pressure sensor being located at said second port of the fluid actuator.

39. An apparatus, as set forth in claim 32, wherein said load classifier includes a fuzzy logic algorithm, said fuzzy logic algorithm being adapted to receive at least one sensor signal and responsively determine said weight of said load and generate said load signal.

40. An apparatus, as set forth in claim 32, wherein said error classifier includes at least one sensor, said at least one sensor adapted to generate a position signal corresponding to a position of said load.

41. An apparatus, as set forth in claim 40, wherein said at least one sensor is a position sensor.

42. An apparatus, as set forth in claim 41, wherein said error classifier includes a derivative manager adapted to receive said position signal and responsively generate a actual velocity signal.

43. An apparatus, as set forth in claim 42, wherein said error classifier includes a fuzzy logic algorithm, said fuzzy logic algorithm being adapted to receive said actual velocity signal and said desired load velocity signal and responsively determine said error of said actual velocity and generate said error signal.

44. An apparatus, as set forth in claim 32, wherein said valve transform manager includes a database, said database containing a plurality of predetermined valve transform curves.

45. An apparatus, as set forth in claim 44, wherein said valve transform manager includes a operation condition identifier, said operation condition identifier being adapted to receive said desired load velocity signal and said load signal and responsively select at least one valve transform curve from said database, and generate a valve transform curve signal.

46. An apparatus, as set forth in claim 45, wherein said valve transform manager includes a valve transform curve interpolator, wherein said valve transform curve interpolator is adapted to receive said valve transform curve signal and interpolate said at least one valve transform curve to generate said valve transform curve.

47. An apparatus, as set forth in claim 46, wherein said valve transform manager includes a autocalibration manager, said auto-calibration manager adapted to receive said error signal, said desired load velocity signal, and said load signal and responsively modify said valve transform curve.

48. An apparatus, as set forth in claim 32, wherein said load includes an implement being controlled by a boom and stick.

49. A method for determining a valve transform curve in a fluid system, the fluid system having a valve and a fluid actuator adapted to initiate movement of a load, including the steps of:

determining a desired velocity of said load;

determining a error value by determining a actual velocity of said load and responsively comparing said actual velocity with said desired velocity;

determining a weight of said load; and determining a valve transform curve in response to said desired velocity, said error value, and said weight of said load.

50. A method, as set forth in claim 49, wherein determining said desired velocity includes the steps of:

determining a load control input value;

determining a pump input speed value; and generating a desired load velocity in response to said load control input value and said pump input speed value.

51. A method as set forth in claim 49, wherein determining said weight of said load includes the steps of:

sensing a pressure of said fluid actuator; determining a weight of said load in response to said pressure.

52. A method as set forth in claim 51, wherein determining said weight of said load in response to said pressure includes the step of utilizing a fuzzy logic algorithm to determine said weight of said load.

53. A method as set forth in claim 49, wherein determining said error value includes the steps of:

sensing a position of said load; determining a actual velocity of said load in response to said position.

54. A method as set forth in claim 53, wherein determining said actual velocity of said load in response to said position includes the step of utilizing a fuzzy logic algorithm to generate said error value.

55. A method, as set forth in claim 49, wherein determining said valve transform curve includes the steps of:

selecting at least one valve transform curve from a database of valve transform curves in response to said weight of said load and said desired load velocity value;

interpolating said at least one valve transform curve and generating a final valve transform curve; and calibrating said valve transform curve in response to said error value.

56. A method, as set forth in claim 49, wherein determining said valve transform curve includes the step of:

selecting at least one valve transform curve from a database of valve transform curves in response to said weight of said load and said desired load velocity value;

calibrating said at least one valve transform curve in response to said error value; and interpolating said at least one valve transform curve and generating a valve transform curve.

* * * * *

UNITED STATES PATENT AND TRADEMARK OFFICE

CERTIFICATE OF CORRECTION

PATENT NO. : 5,784,945

DATED : July 28, 1998

INVENTOR(S) : Krone et al.

It is certified that error appears in the above-identified patent and that said Letters Patent is hereby corrected as shown below:

On the title page: Item [54] and Column 1, line 3, should read--

METHOD AND APPARATUS FOR DETERMINING A VALVE TRANSFORM CURVE --.

Signed and Sealed this

Seventeenth Day of August, 1999

Attest:

Q. TODD DICKINSON

*Attesting Officer* *Acting Commissioner of Patents and Trademarks*